United States Patent [19]
Helt et al.

[11] 4,207,776
[45] Jun. 17, 1980

[54] ADJUSTABLE EMERGENCY FAN BELT

[75] Inventors: Raymond E. Helt, Pocatello; Stanley M. Davis, Salmon, both of Id.

[73] Assignee: Rass, Inc., Pocatello, Id.

[21] Appl. No.: 871,641

[22] Filed: Jan. 23, 1978

[51] Int. Cl.² .............................................. F16G 12/40
[52] U.S. Cl. ........................ 74/235; 24/31 B; 24/31 C; 24/32; 24/68 SK; 24/71 A; 24/71 ST; 74/231 J
[58] Field of Search .............. 74/231 J, 231 M, 234, 74/258, 235; 24/31 R, 31 B, 31 C, 32, 38, 68 R, 68 B, 68 SK, 68 J, 68 SP, 68 AS, 68 PP, 68 FP, 69 R, 69 ST, 69 SK, 71 R, 71 T, 71 ST, 71 TT, 71 A

[56] References Cited
U.S. PATENT DOCUMENTS

| | | | |
|---|---|---|---|
| 352,532 | 11/1886 | Fox et al. | 24/68 SK |
| 502,798 | 8/1893 | Wilbur | 24/31 C |
| 1,260,307 | 3/1918 | Blanton | 74/235 |
| 1,313,028 | 8/1919 | Smith et al. | 74/235 |
| 1,442,524 | 1/1923 | House | 74/235 |
| 2,994,934 | 8/1961 | Kraus | 24/71 ST |
| 3,608,155 | 9/1971 | Burgess | 24/32 |
| 3,732,597 | 5/1973 | Epstein | 24/31 B |
| 3,777,586 | 12/1973 | Stirton | 74/231 J |
| 3,841,168 | 10/1974 | Daniels | 74/231 J |
| 4,049,301 | 9/1977 | Schenk | 24/68 R |
| 4,051,740 | 10/1977 | Narang | 24/231 J |

FOREIGN PATENT DOCUMENTS

| | | | |
|---|---|---|---|
| 248918 | 12/1965 | Austria | 24/68 SK |
| 2419951 | 11/1975 | Fed. Rep. of Germany | 74/231 J |
| 2648993 | 3/1978 | Fed. Rep. of Germany | 74/235 |
| 293151 | 2/1932 | Italy | 24/71 A |

Primary Examiner—Samuel Scott
Assistant Examiner—Daniel J. O'Connor
Attorney, Agent, or Firm—K. S. Cornaby

[57] ABSTRACT

An adjustable emergency fan belt is provided which substitutes in an emergency as a fan belt. The emergency fan belt has a plurality of belt links that may be used in any combination with a main belt to produce a belt of various lengths. Installation of the belt around the fly wheels is relatively simple and requires no mechanical skill or tools.

6 Claims, 4 Drawing Figures

ADJUSTABLE EMERGENCY FAN BELT

BACKGROUND OF THE INVENTION

This invention relates to the field of fan belts and specifically to fan belts adapted to temporary emergency repair of automobiles or industrial machinery.

The principles supporting the use of a fan belt have long been known. Prior to the making of this invention, fan belt devices presented problems in breakage and replacement. To decrease the frequency of breaking, fan belts have been constructed of more durable materials. However, this measure has not totally solved the problem because the belts eventually break. Automobile travelers have often been stranded by broken fan belts, or have done significant damage to automobile engines by operating the engines without belts. In early automotive history, this problem could be avoided by carrying a replacement fan belt of the proper size. Now, automobiles utilize several such belts of various sizes to operate sophisticated accessories such as power steering and air conditioning. Motorists generally do not carry a full complement of the various size belts. Also in early automotive history, replacement of the belt did not require extensive labor or tools. Today, replacement of one broken fan belt can require the removal of all other fan belts with the attendant loosening or removal of fly wheels and other equipment to which the belts are attached.

It is an objective of the present invention to eliminate the problems recognized in the art by providing an emergency fan belt for temporary application which can be easily adjusted to substitute for various sized belts, can be easily applied without any special tools or mechanic skills, and permits operation of the machine or automobile until a replacement belt can be more conveniently installed.

SUMMARY OF THE INVENTION

The adjustable fan belt of the invention comprises a main belt and a plurality of various sized belt links. The main belt has a clamp lock disposed at one end and curled receiving hooks disposed at the other end. Each belt link has curled receiving hooks and a swingable ring disposed at opposite ends. The belt links are connected by snapping the swingable ring into position within the curled receiving hooks. Once a sufficient number of links are positioned together with the main belt to provide a belt of desired length, the belt is placed into position around the fly wheels and the clamp lock is connected to the last link. The machine or automobile may be operated with the adjustable emergency belt thus positioned until a replacement belt can be employed.

THE DRAWINGS

A preferred embodiment of the invention is illustrated in the accompanying drawings, in which.

DETAILED DESCRIPTION OF THE ILLUSTRATED EMBODIMENT

Figure 1:
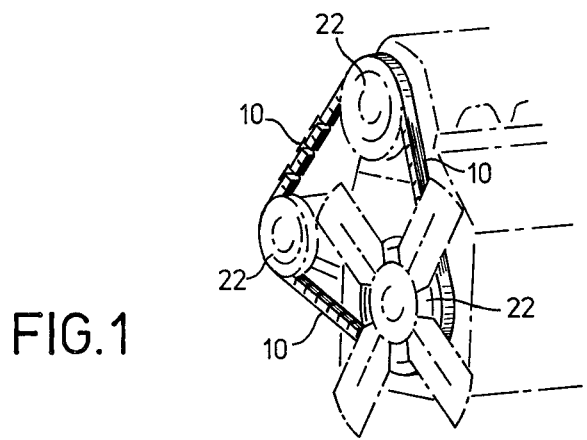
FIG. 1 is a perspective view of the emergency fan belt in representative application on an automobile engine shown in outline form.
Figure 2:
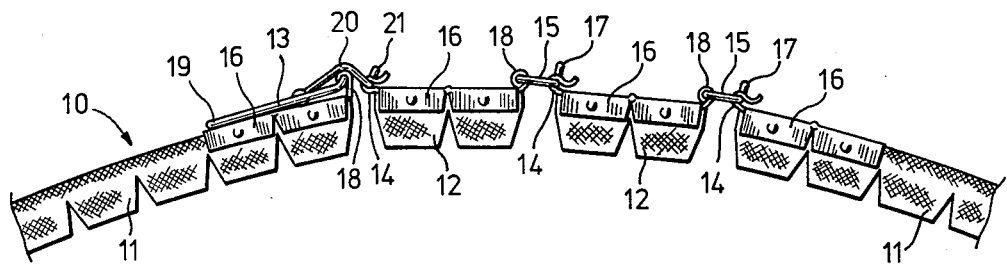
FIG. 2 is a side elevational view of a portion of a belt showing a plurality of links connected and clamped into position.
Figure 3:
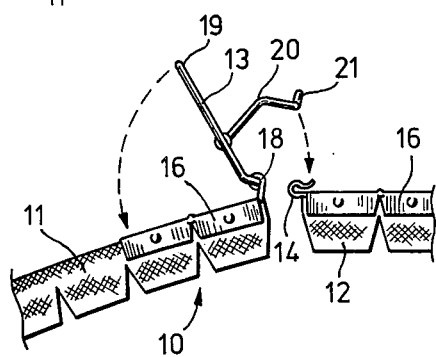
FIG. 3 is a side elevational view of a portion of a belt showing the operational movement of the clamp lock and the curled receiving hooks.
Figure 4:
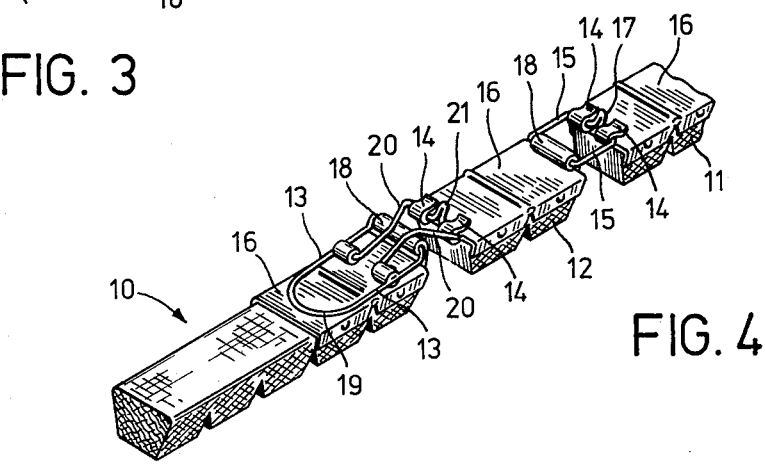
FIG. 4 is a perspective view of a portion of a belt showing the disposition of the clamp lock, curled receiving hooks, and a belt link when operational.

As shown in FIGS. 1-4, a preferred embodiment of the adjustable emergency fan belt 10 comprises a main belt 11 and a plurality of belt links 12. Affixed to one end of said main belt 11 is a clamp lock 13 and affixed to the other end are curled receiving hooks 14. Each belt link 12 has curled receiving hooks 14 and a swingable attachment ring 15 disposed at opposite ends thereof. Said clamp lock 13, receiving hooks 14, and attachment rings 15 are affixed to main belt 11 or belt link 12 by a metal base 16 which is rivetted onto or has cleats which bite into the belt. The curled receiving hooks 14 are preferably shaped substantially as shown in FIGS. 2-4.

In operation, upon receiving clamp lock 13 or attachment ring 15, hooks 14 snap and lock ring 15 or clamp 13 into position. Each attachment ring is preferably shaped substantially as shown in FIG. 4 with a fold 17 opposite the side disposed within the hinge 18. Fold 17 serves to eliminate lateral sliding of belt links 12. Clamp lock 13 also is attached swingably to a hinge 18. Hinges 18 are affixed to metal bases 16. The clamp lock 13 comprises a cinching loop 19 with a swingable looped prong 20 affixed thereto. The looped prong 20 has a fold 21 similar to the fold 17 of an attachment ring 15. As shown in FIG. 3, the clamp lock 13 swings such that the looped prong 20 will engage receiving hooks 14 and the cinching loop 19 will clamp the prong 20 securely within the hooks 14. This procedure cinches the adjustable belt tightly against the fly wheels 22, as representatively illustrated in FIG. 1, to prevent slipping.

The main belt 11 and belt links 12 may be made of various lengths, so that different combinations of main belt and belt links can form standard belt sizes for temporary replacement purposes.

Mounting of the adjustable emergency fan belt 10 is relatively simple, and requires no loosening, removing, or readjusting of fly wheels or other fan belts. After the temporary emergency use, removal of belt 10 from the motor is accomplished by lifting the cinching loop 19 and disengaging the looped prong 20. This allows belt 10 to be reused.

It is to be understood that the particular form of the invention described herein and illustrated in the accompanying drawings is a preferred embodiment. Various changes in shape, size, materials, and arrangement of parts may be made without departing from the spirit of the invention as defined in the attached claims.

I claim:

1. An emergency fan belt assembly providing adjustable belt sizes, comprising in combination:
    a main belt, in a fan belt assembly with a clamp lock and spaced receiving hooks disposed at opposite ends thereof; said clamp lock being moveably attached to said main belt for securing to said spaced receiving hooks, and said clamp lock comprising a lever bar rotatably attached about a laterally-extending axis to one end of said main belt, and clamp means extending rotatably outwardly from said bar for securing in said receiving hooks.
    at least one extension belt link having a receiving hook and an attachment ring attached respectively at opposite ends of said link for attachment to an end of said main belt; and a perpendicularly extending member comprising means attached to said clamp means for insertion between said spaced receiving hooks for holding said clamp lock and attachment ring laterally in place with respect to said receiving hooks.

2. An emergency belt as set forth in claim 1, wherein said clamp lock receiving hooks, and attachment rings are mounted on metal bases affixed to the belt surface.

3. An emergency belt as set forth in claim 1, wherein said belt link is adapted for attachment to another belt link.

4. An emergency belt as set forth in claim 1, wherein said clamp lock and attachment rings are swingably mounted within hinges affixed on bases attached to the belt.

5. An emergency belt as set forth in claim 1, wherein said receiving hooks have an offset portion, such that when said clamp lock is engaged therein, the lock snaps securely into position.

6. An emergency belt as set forth in claim 1, wherein more than one link is provided having various lengths, for providing different sized belts by connecting combinations of links with the main belt.

* * * * *